United States Patent
Jiang et al.

(10) Patent No.: US 11,435,953 B2
(45) Date of Patent: Sep. 6, 2022

(54) METHOD FOR PREDICTING LBA INFORMATION, AND SSD

(71) Applicant: SHENZHEN DAPU MICROELECTRONICS CO., LTD., Shenzhen (CN)

(72) Inventors: Li Jiang, Shenzhen (CN); Xiang Chen, Shenzhen (CN); Weijun Li, Shenzhen (CN)

(73) Assignee: SHENZHEN DAPU MICROELECTRONICS CO., LTD., Shenzhen (CN)

( * ) Notice: Subject to any disclaimer, the term of this patent is extended or adjusted under 35 U.S.C. 154(b) by 0 days.

(21) Appl. No.: 17/111,493

(22) Filed: Dec. 3, 2020

(65) Prior Publication Data
US 2021/0096777 A1    Apr. 1, 2021

Related U.S. Application Data

(63) Continuation of application No. PCT/CN2019/095198, filed on Jul. 9, 2019.

(30) Foreign Application Priority Data

Jul. 18, 2018  (CN) .......................... 201810789741.0

(51) Int. Cl.
| | |
|---|---|
| *G06F 3/06* | (2006.01) |
| *G06F 9/448* | (2018.01) |
| *G06K 9/62* | (2022.01) |

(52) U.S. Cl.
CPC .......... *G06F 3/0659* (2013.01); *G06F 3/0614* (2013.01); *G06F 3/0653* (2013.01);
(Continued)

(58) Field of Classification Search
USPC ........................................................ 711/154
See application file for complete search history.

(56) References Cited

U.S. PATENT DOCUMENTS

| | | | |
|---|---|---|---|
| 2006/0184752 A1 | 8/2006 | Takano | |
| 2018/0181328 A1* | 6/2018 | Espeseth | ............... G06F 3/0659 |
| 2019/0317901 A1* | 10/2019 | Kachare | ............... G06N 3/0454 |

FOREIGN PATENT DOCUMENTS

| | | |
|---|---|---|
| CN | 1996226 A | 7/2007 |
| CN | 101008907 A | 8/2007 |

(Continued)

OTHER PUBLICATIONS

International Search Report and Written Opinion issued in corresponding International Application No. PCT/CN2019/095198, dated Oct. 9, 2019, 5 pages.

*Primary Examiner* — Charles Rones
*Assistant Examiner* — Jonah C Krieger
(74) *Attorney, Agent, or Firm* — Bayes PLLC

(57) ABSTRACT

A method for predicting logical blocks address (LBA) information, including: receiving, by a Solid State Drive (SSD), a trace sent from a host, wherein the host can acquire the trace in a reusable environment; determining, by the SSD, one or more LBAs received by the SSD according to the trace; obtaining, by the SSD, a distribution of the LBAs by learning the LBAs based on a preset learning algorithm; and predicting, by the SSD, one or more subsequent LBAs based on the distribution of the LBAs. As a result, it can perform heat classification and prediction of the following LBA used in the SSD by means of learning the LBA distribution of the SSD in a certain reusable environment of the host, thus to improve the hit rate of reading and writing and the efficiency of classification of hot and cold data in garbage collection.

15 Claims, 2 Drawing Sheets

(52) U.S. Cl.
CPC .......... *G06F 3/0679* (2013.01); *G06F 9/4498* (2018.02); *G06K 9/6223* (2013.01)

(56) References Cited

FOREIGN PATENT DOCUMENTS

| | | | |
|---|---|---|---|
| CN | 101183348 | A | 5/2008 |
| CN | 106250064 | A | 12/2016 |
| CN | 107943715 | A | 4/2018 |
| CN | 109189693 | A | 1/2019 |

* cited by examiner

METHOD FOR PREDICTING LBA INFORMATION, AND SSD

CROSS-REFERENCE TO RELATED APPLICATIONS

The present application is a continuation of International Application No. PCT/CN2019/095198, filed on Jul. 9, 2019, which claims the benefit of priority to Chinese Patent Application No. 201810789741.0, filed on Jul. 18, 2018. The entire contents of both applications are incorporated herein by reference.

TECHNICAL FIELD

The present disclosure relates to the field of data processing, and in particular, to a method and an SSD for predicting LBA information.

BACKGROUND

Solid State Drive (SSD) typically needs to predict the logical blocks addresses (LBA) that are supplied to the host subsequently. If the LBA information can be predicted as accurately as possible, the hot LBA data can be buffered into the buffer, which can improve the performance of the reading and writing command and reduce the delay. At the same time, if the following LBA data can be predicted to be hot data or cold data, the FTL algorithm in the SSD can classify the hot and cold data to improve the efficiency of Garbage Collection (GC). The current IO PATTERN prediction technology is mainly divided into the following two categories:

An explicit algorithm based on the host's access frequency and proximity information to the LBA, including the statistics of the LBA writing frequency, the statistics of the LBA life cycle (Age), the statistics of the interval of two same LBA in a row (IRR), and some algorithms even combine the LBA writing frequency and Age. This kind of algorithm basically needs to count all LBA access frequency and other information in the memory, which requires huge memory capacity.

Another batch of algorithms use an implicit algorithm to count the current frequency or heat information of the nearest or hottest LBA by using data structures. This kind of algorithm is similar to the CPU cache statistics of the host system, and mainly includes Multiple LRUlist, Multiple hash functions (MHF), Multiple Bloom Filters (MBF), and Window-based Direct Address Counting.

Currently, the popular cluster-based algorithms mainly include Dynamic DATA CLUSTERING (DAC), IRR based K-Means, and Extent-based Temperature. Using specific algorithms to classify data into multiple classes due to its heat can significantly improve the GC efficiency.

The current mainstream explicit algorithms, although having a high accuracy rate, need to store a set of heat information in the memory for each LBA, which occupies a lot of memory and is basically infeasible for an embedded system. Moreover, it can only distinguish between hot and cold data, and can't predict the next LBA. A invariable threshold of the hot and the cold data cannot accommodate all host loads either.

The current mainstream implicit algorithms only need limited memory to record the information such as LRU list, bloom filter size and so on. But there may be false alarms in the prediction of hot and the cold data. Similarly, the next LBA cannot be predicted.

The cluster-based algorithms can improve the accuracy of the partitioning of the hot and the cold data while minimizing the memory occupancy, and has higher performance. Similarly, they can only classify the data of hot and cold, but cannot predict.

SUMMARY OF THE DISCLOSURE

The present disclosure is to overcome the deficiencies of the prior art, and provide a method and an SSD for predicting LBA information, which can learn the LBA distribution of the SSD in a certain reusable environment of the host; and perform heat classification and prediction of the following LBA used in the SSD, to improve the hit rate of reading and writing and the efficiency of classification of hot and cold data in garbage collection.

In order to solve the above problems, in a first aspect, the present disclosure provides a method for predicting logical blocks address (LBA) information, including:

receiving, by a Solid State Drive (SSD), a trace sent from a host, wherein the host can acquire the trace in a reusable environment;

determining, by the SSD, one or more LBAs received by the SSD according to the trace;

obtaining, by the SSD, a distribution of the LBAs by learning the LBAs based on a preset learning algorithm; and predicting, by the SSD, one or more subsequent LBAs based on the distribution of the LBAs.

In some embodiments, the step of determining, by the SSD, the one or more LBAs includes:

determining, by the SSD, one or more reading and writing commands sent by the host according to the trace; and determining, by the SSD, an LBA and a process ID parameter carried by the reading and writing commands.

In some embodiments, the step of obtaining, by the SSD, the distribution of the LBAs includes:

determining, by the SSD, a distance between each pair of adjacent LBAs;

determining, by the SSD, a target distance that is greater than a preset threshold value among the distances between the adjacent LBAs;

recording, by the SSD, the target distance and a corresponding process ID of a current LBA as a two-dimensional coordinate, wherein the abscissa of the two-dimensional coordinate represents the target distance, the ordinate represents the process ID, and the SSD obtains M two-dimensional coordinates, wherein M is a positive integer;

performing, by the SSD, a K-MEANS clustering operation on the M two-dimensional coordinates to obtain N classes, wherein N is a positive integer;

establishing, by the SSD, N Long Short Term Memory networks (LSTM) state machines by taking the result of N classes as the prediction targets of the LSTM; and training, by the SSD, parameters of the N LSTM state machines by inputting the M two-dimensional coordinates to the N LSTM state machines.

In some embodiments, the step of predicting, by the SSD, the subsequent LBAs includes:

determining, by the SSD, a target LSTM state machine based on the trained parameters of the N LSTM state machines; and predicting, by the SSD, the subsequent LBAs based on the target LSTM state machine.

In some embodiments, the step of predicting, by the SSD, the subsequent LBAs includes:

receiving, by the SSD, one or more subsequent reading and writing commands sent from the host;

determining, by the SSD, the subsequent LBAs and one or more subsequent process ID parameters carried in the subsequent reading and writing commands sent from the host;

determining, by the SSD, that a distance between adjacent subsequent LBAs is greater than a preset threshold;

inputting the distance between the adjacent subsequent LBAs and the process ID of the corresponding current LBA as the two-dimensional coordinates into the target LSTM state machine; and obtaining a heat classification of the subsequent LBAs.

In a second aspect, the present disclosure also provides a solid state drive ("SSD"), including:

a receiving module, configured to receive a trace sent from a host, wherein the host can acquire the trace of the SSD in a reusable environment;

a determining module, configured to determine, according to the trace, one or more LBAs received by the SSD;

an obtaining module, configured to obtain a distribution of the LBAs by learning the LBAs based on a preset learning algorithm; and a prediction module, configured to predict one or more subsequent LBAs based on the distribution of the LBAs.

In some embodiments, the determining module is configured to determine, according to the trace, one or more reading and writing commands sent by the host, and determine an LBA and a process ID parameter carried by the reading and writing commands.

In some embodiments, the obtaining module is further configured to determine a distance between each pair of adjacent LBAs;

determine a target distance that is greater than a preset threshold value among the distances between the adjacent LBAs;

record the target distances and a corresponding process ID of a current LBA as a two-dimensional coordinate, wherein the abscissa of the two-dimensional coordinate represents the target distance, the ordinate represents the process ID, and the SSD obtains M two-dimensional coordinates, wherein M is a positive integer;

perform a K-MEANS clustering operation on the M two-dimensional coordinates to obtain N classes, wherein N is a positive integer;

establish N Long Short Term Memory networks (LSTM) state machines by taking the result of N classes as prediction targets of the LSTM; and train parameters of the N LSTM state machines by inputting the M two-dimensional coordinates to N LSTM state machines.

In some embodiments, the prediction module is further configured to determine a target LSTM state machine based on the trained parameters of the N LSTM state machines; and classify the subsequent LBAs based on the target LSTM state machine.

In some embodiments, the prediction module is further configured to:

receive one or more subsequent reading and writing commands sent from the host;

determine the subsequent LBA and one or more subsequent process ID parameters carried in the subsequent reading and writing command sent from the host;

determine that a distance between adjacent subsequent LBAs is greater than a preset threshold;

input the distance between the adjacent subsequent LBAs and the process ID of the corresponding current LBA as the two-dimensional coordinates into the target LSTM state machine; and obtain a heat classification of the subsequent LBAs.

In a third aspect, the present disclosure provides a system for predicting LBA information, including:

a host configured to generate reading and writing commands; and a solid state drive ("SSD"), including:

a receiving module, configured to receive a trace sent from a host, wherein the host can acquire the trace of the SSD in a reusable environment;

a determining module, configured to determine, according to the trace, one or more LBAs received by the SSD;

an obtaining module, configured to obtain a distribution of the LBAs by learning the LBAs based on a preset learning algorithm; and a prediction module, configured to predict one or more subsequent LBAs based on the distribution of the LBAs.

In some embodiments, the determining module is further configured to:

determine, according to the trace, one or more reading and writing commands sent by the host, and determine an LBA and a process ID parameter carried by the reading and writing commands.

In some embodiments, the obtaining module is further configured to:

determine a distance between each pair of adjacent LBAs;

determine a target distance that is greater than a preset threshold value among the distances between the adjacent LBAs;

record the target distances and a corresponding process ID of a current LBA as a two-dimensional coordinate, wherein the abscissa of the two-dimensional coordinate represents the target distance, the ordinate represents the process ID, and the SSD obtains M two-dimensional coordinates, wherein M is a positive integer;

perform a K-MEANS clustering operation on the M two-dimensional coordinates to obtain N classes, wherein N is a positive integer;

establish N Long Short Term Memory networks (LSTM) state machines by taking the result of N classes as prediction targets of the LSTM; and train parameters of the N LSTM state machines by inputting the M two-dimensional coordinates to N LSTM state machines.

In some embodiments, the prediction module is further configured to:

determine a target LSTM state machine based on the trained parameters of the N LSTM state machines; and classify the subsequent LBAs based on the target LSTM state machine.

In some embodiments, the prediction module is further configured to:

receive one or more subsequent reading and writing commands sent from the host;

determine the subsequent LBA and one or more subsequent process ID parameters carried in the subsequent reading and writing command sent from the host;

determine that a distance between adjacent subsequent LBAs is greater than a preset threshold;

input the distance between the adjacent subsequent LBAs and the process ID of the corresponding current LBA as the two-dimensional coordinates into the target LSTM state machine; and obtain a heat classification of the subsequent LBAs.

BRIEF DESCRIPTION OF THE DRAWINGS

In order to more clearly illustrate the embodiments of the present application, the drawings to be used in the embodi

DETAILED DESCRIPTION

The technical solutions in the embodiments of the present disclosure are clearly and completely described in the following with reference to the accompanying drawings in the embodiments of the present disclosure. It is obvious that the described embodiments are only a part of the embodiments of the present disclosure, but not all embodiments. All other embodiments obtained by a person skilled in the art based on the embodiments of the present disclosure without creative efforts are within the scope of the present disclosure.

In order to accurately understand the data processing method and the storage device of the embodiment of the present disclosure, some terms related to the data processing method and the storage device of the embodiment of the present disclosure are introduced below.

Figure 1:
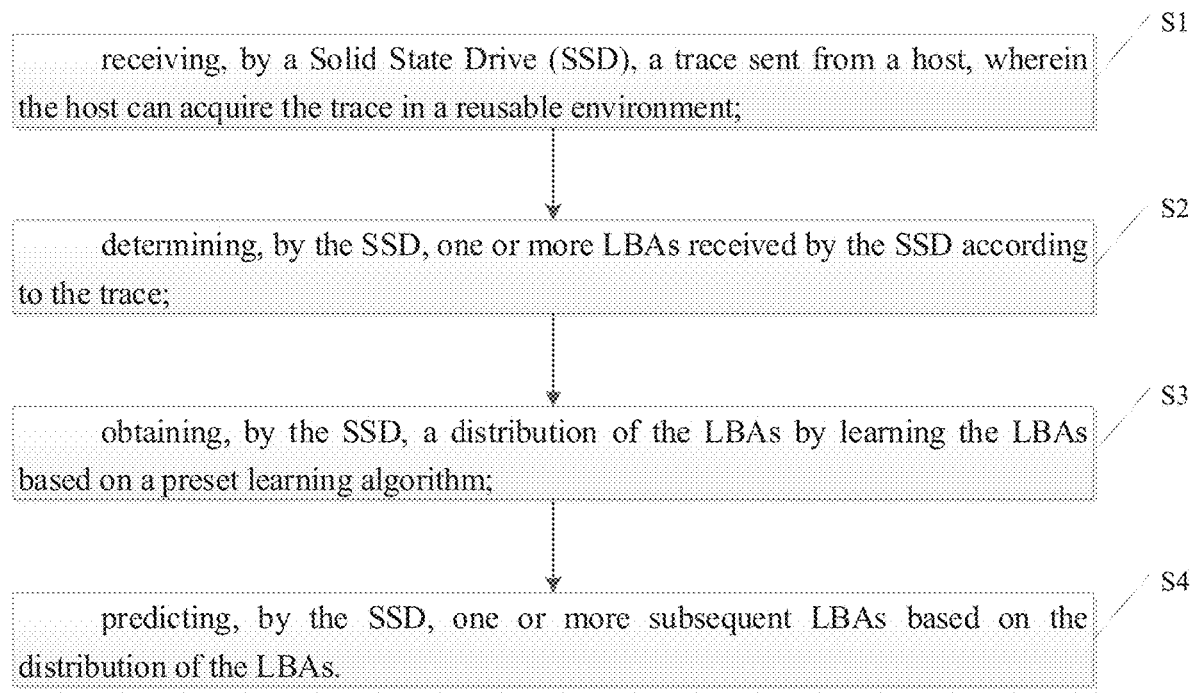
- FIG. 1 is a flow chart showing the steps of an embodiment of a method for predicting LBA information of the present disclosure.

As shown in FIG. 1, a method for predicting LBA information, comprising:

S1: receiving, by the SSD, the trace sent from the host; and from the trace, the host can acquire the trace of the SSD in a certain reusable environment;

S2: determining, by the SSD, all LBA currently received by the SSD according to the Trace;

S3: learning, by the SSD, all the LBA based on the preset learning algorithm to obtain the distribution of all the LBA;

S4: classifying and predicting, by the SSD, the heat of the subsequent LBA based on the LBA distribution.

In the foregoing step S1, the host obtains a trace of the SSD in a certain reusable environment (the user uses the scene and mode regularly), and replays the trace to the SSD; wherein the trace carries read and write commands.

In step S2, the SSD receives the trace, and the trace carries the read and write commands; furthermore, the read and write command carries the LBA. In addition, a logical block is a data block stored in a disk or tape, and the data block has an address to retrieve or rewrite. The term logic block is generally used to refer to the physical device data addressing from the host angle. In a storage device, it is often necessary to translate a logical block address provided to a host into a physical media address in which the corresponding data is actually stored.

In step S3, the firmware of SSD learns all the received LBAs through the learning algorithm to learn the patterns and rules of the LBA.

In step S4, the firmware of SSD enters the real use session, and classifies and predicts the heat of the subsequent LBA according to the LBA patterns and rules learned during the learning phase.

The present disclosure provides a method of predicting LBA information, which includes performing heat classification and prediction of the following LBA used in the SSD by means of learning the LBA distribution of the SSD in a certain reusable environment of the host, thus to improve the hit rate of reading and writing and the efficiency of classification of hot and cold data in garbage collection.

In some embodiments, the foregoing step S2 includes:

determining, by the SSD, all reading and writing commands sent by the host according to the Trace;

determining, by the SSD, the LBA and the process number ID parameters carried in the reading and writing commands.

In this embodiment, the host sends all the read and write commands with the LBA and the process ID parameter, so that the SSD can determine the LBA and process ID parameters carried in the read and write commands.

In some embodiments, the foregoing step S3 includes:

determining, by the SSD, the distance between each adjacent LBA in turn;

determining, by the SSD, a target distance that is greater than a preset threshold value among the distances between the adjacent LBAs;

recording, by the SSD, the target distances and the corresponding process IDs of the current LBAs as a two-dimensional coordinate, and obtains M two-dimensional coordinates; wherein the abscissa of the two-dimensional coordinate represents the distance, and the ordinate represents the process ID, and the M is a positive integer;

performing, by the SSD, a K-MEANS clustering operation on the M two-dimensional coordinates to obtain N classes, wherein the N is a positive integer;

establishing, by the SSD, N LSTM state machines by taking the result of N classes as the prediction targets of the LSTM;

training, by the SSD, the parameters of the N LSTM state machines by inputting the M two-dimensional coordinates to the N LSTM state machines.

In this embodiment, whenever the distance between LBA (n+1) and LBA(n) is greater than a threshold th, the SSD calculates the difference value of LBA as $\Delta LBA = LBA(n+1) - LBA(n)$; then obtains the process ID of the current LBA, and records ($\Delta LBA$, ID) as a record point of the K-MEANS algorithm.

When the Trace playback is completed, the two-dimensional coordinates including all M ($\Delta LBA$, ID) are subjected to K-MEANS clustering operation to obtain N classes.

The SSD establishes N LSTM state machines by taking the result of N classes as the prediction targets of the LSTM.

The SSD inputs M two-dimensional coordinates including the ($\Delta LBA$, ID) into the N LSTM state machines, and trains the parameters of the N LSTM state machines. The trained parameters are used as input parameters for following prediction.

In some embodiments, the foregoing step S4 includes:

determining, by the SSD, a target LSTM state machine based on the parameters of the N LSTM state machines obtained by training;

classifying and predicting, by the SSD, the heat of the subsequent LBA based on the target LSTM state machine.

Further, the step of classifying and predicting, by the SSD, the heat of the subsequent LBA based on the target LSTM state machine further comprises:

receiving, by the SSD, the subsequent read and write command sent from the host;

determining, by the SSD, the subsequent LBA and the subsequent process ID parameter carried in the subsequent read and write command sent from the host;

if the distance between adjacent subsequent LBAs is determined to be greater than a preset threshold by the SSD, inputting the distance between the subsequent LBAs and the two-dimensional coordinates recorded by the process ID of the corresponding current LBA into the target LSTM state machine, and then obtaining the heat classification and prediction of the subsequent LBA.

In this embodiment, the SSD enters a real use session. Each read or write command sent from the host to the SSD needs to carry the LBA and process ID information. Among them, the learning phase is to learn the trace, rather than really to provide services for the users. The real use refers to providing the customers with standard services of SSD. The read and write commands are the basic command interfaces of the storage device.

If the distance, received by the SSD, between the LBA (n+1) and LBA(n) is greater than a threshold of th, the coordinate of (ΔLBA, ID) is input to the LSTM of the corresponding cluster to obtain a prediction of the next LBA.

Figure 2:
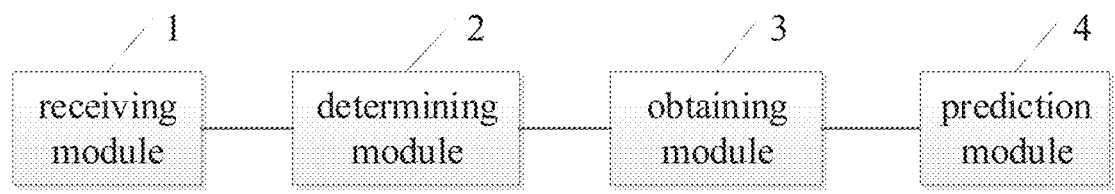
FIG. 2 is a schematic structural view of an embodiment of an SSD of the present disclosure.

As shown in FIG. 2, a solid state drive is provided, comprising:

a receiving module1, configured to receive a trace sent from the host; wherein the host can acquire the trace of the SSD in a certain reusable environment;

a determining module2, configured to determine, according to the trace, all LBAs currently received by the SSD;

a learning module3, configured to learn all the LBAs based on a preset learning algorithm to obtain an LBA distribution; and a prediction module4, configured to perform heat classification and prediction on subsequent LBAs based on the LBA distribution.

The SSD provided by this embodiment performs heat classification and prediction of the following LBA used in the SSD by means of learning the LBA distribution of the SSD in a certain reusable environment of the host. Thus to improve the hit rate of reading and writing and the efficiency of classification of hot and cold data in garbage collection.

In some embodiments, the determining module 2 is configured to determine, according to the trace, all read and write commands sent from the host, and determine the LBA and the process ID parameter carried in the read and write command.

In some embodiments, the learning module3 is specifically configured to determine the distance between the adjacent LBAs; determine a target distance that is greater than a preset threshold value among the distances between the adjacent LBAs; sequentially record the target distances and the corresponding process IDs of the current LBAs as a two-dimensional coordinate, and obtain M two-dimensional coordinates; wherein the abscissa of the two-dimensional coordinate represents the distance, and the ordinate represents the process ID, and the M is a positive integer; perform a K-MEANS clustering operation on the M two-dimensional coordinates to obtain N classes, wherein the N is a positive integer; establish N LSTM state machines by taking the result of N classes as the prediction targets of the LSTM; train the parameters of the N LSTM state machines by inputting the M two-dimensional coordinates to the N LSTM state machines.

In some embodiments, the prediction module4 is specifically configured to determine a target LSTM state machine based on the parameters of the N LSTM state machines obtained by training; and classify and predict the heat of the subsequent LBA based on the target LSTM state machine.

In some embodiments, the prediction module4 is specifically configured to receive the subsequent read and write command sent from the host; determine the subsequent LBA and the subsequent process ID parameter carried in the subsequent read and write command sent from the host; if the distance between adjacent subsequent LBAs is determined to be greater than the preset threshold by the SSD, input the distance between the subsequent LBAs and the two-dimensional coordinates recorded by the process ID of the corresponding current LBA into the target LSTM state machine, and then obtain the heat classification and prediction of the subsequent LBA.

It should be noted that SSD and the method of predicting LBA information in the above embodiments are based on the same inventive concept. Therefore, the specific functions in the function modules of the SSD can have corresponding method steps, and the details are not described herein again.

The above embodiments are only used to illustrate the technical solutions of the present disclosure, and are not intended to be limiting; although the present disclosure has been described in detail with reference to the foregoing embodiments, those of ordinary skill in the art should understand that The technical solutions are described as being modified, or equivalent to some of the technical features, and the modifications and substitutions do not depart from the spirit and scope of the technical solutions of the embodiments of the present disclosure.

What is claimed is:

1. A method for predicting logical blocks address (LBA) information, comprising:
    receiving, by a Solid State Drive (SSD), a trace sent from a host, wherein the host acquires the trace in a reusable environment;
    determining, by the SSD, LBAs received by the SSD according to the trace, wherein the trace comprises reading or writing commands each of which carries a corresponding LBA and a corresponding process identifier (ID) parameter;
    obtaining, by the SSD, a distribution of the LBAs by learning the LBAs based on a preset learning algorithm through:
        determining M target distances from the LBAs, wherein M is a positive integer:
        generating M two-dimensional coordinates based on the M target distances, wherein an abscissa and an ordinate of each two-dimensional coordinate represent a corresponding target distance and a process ID parameter of a LBA associated with the corresponding target distance, respectively;
        establishing N state machines based on the M two-dimensional coordinates, wherein N is a positive integer; and
        training parameters of the N state machines by inputting the M two-dimensional coordinates to the N state machines; and
    predicting, by the SSD, one or more subsequent LBAs based on the distribution of the LBAs.

2. The method of claim 1, wherein determining, by the SSD, the LBAs comprises:
    determining, by the SSD, the one or more reading or writing commands sent by the host according to the trace; and
    determining, by the SSD, the corresponding LBA and the corresponding process ID parameter carried by each of the reading or writing commands.

3. The method of claim 1, wherein:
    determining the M target distances from the LBAs comprises:
        determining, by the SSD, a distance between each pair of adjacent LBAs from the LBAs, so that a plurality of distances are determined for a plurality of pairs of adjacent LBAs, respectively; and
        determining, by the SSD, the M target distances that are greater than a preset threshold value from the plurality of distances;

generating the M two-dimensional coordinates based on the M target distances comprises:
for each target distance, recording, by the SSD, the target distance and a corresponding process ID parameter of a LBA associated with the target distance as a two-dimensional coordinate, wherein an abscissa of the two-dimensional coordinate represents the target distance, an ordinate of the two-dimensional coordinate represents the corresponding process ID-parameter, and the SSD obtains the M two-dimensional coordinates;
establishing the N state machines based on the M two-dimensional coordinates comprises:
performing, by the SSD, a K-MEANS clustering operation on the M two-dimensional coordinates to obtain the N classes; and
establishing, by the SSD, N Long Short Term Memory networks (LSTM) state machines by taking the N classes as prediction targets of LSTM; and
training the parameters of the N state machines by inputting the M two-dimensional coordinates to the N state machines comprises:
training, by the SSD, parameters of the N LSTM state machines by inputting the M two-dimensional coordinates to the N LSTM state machines.

4. The method of claim 3, wherein predicting, by the SSD, the one or more subsequent LBAs comprises:
determining, by the SSD, a target LSTM state machine based on the trained parameters of the N LSTM state machines; and
predicting, by the SSD, the one or more subsequent LBAs based on the target LSTM state machine.

5. The method of claim 4, wherein predicting, by the SSD, the one or more subsequent LBAs further comprises:
receiving, by the SSD, one or more subsequent reading or writing commands sent from the host;
determining, by the SSD, the one or more subsequent LBAs and one or more subsequent process ID parameters carried in the one or more subsequent reading or writing commands sent from the host;
determining, by the SSD, that a distance between adjacent subsequent LBAs is greater than the preset threshold;
inputting the distance between the adjacent subsequent LBAs and a process ID parameter of a corresponding current LBA as a two-dimensional coordinate into the target LSTM state machine; and
obtaining a heat classification of the one or more subsequent LBAs.

6. A solid state drive (SSD), comprising:
a processor configured to:
receive a trace sent from a host, wherein the host acquires the trace of the SSD in a reusable environment;
determine, according to the trace, LBAs received by the SSD, wherein the trace comprises reading or writing commands each of which carries a corresponding LBA and a corresponding process identifier (ID) parameter;
obtain a distribution of the LBAs by learning the LBAs based on a preset learning algorithm through:
determining M target distances from the LBAs, wherein M is a positive integer;
generating M two-dimensional coordinates based on the M target distances, wherein an abscissa and an ordinate of each two-dimensional coordinate represent a corresponding target distance and a process ID parameter of a LBA associated with the corresponding target distance, respectively;
establishing N state machines based on the M two-dimensional coordinates, wherein N is a positive integer; and
training parameters of the N state machines by inputting the M two-dimensional coordinates to the N state machines; and
predict one or more subsequent LBAs based on the distribution of the LBAs.

7. The SSD of claim 6, wherein the processor is further configured to:
determine, according to the trace, the reading or writing commands sent by the host; and
determine the corresponding LBA and the corresponding process ID parameter carried by each of the reading or writing commands.

8. The SSD of claim 6, wherein:
to determine the M target distances from the LBAs, the processor is further configured to:
determine a distance between each pair of adjacent LBAs from the LBAs, so that a plurality of distances are determined for a plurality of pairs of adjacent LBAs, respectively; and
determine the M target distances that are greater than a preset threshold value from the plurality of distances;
to generate the M two-dimensional coordinates based on the M target distances, the processor is further configured to:
for each target distance, record the target distances and a corresponding process ID parameter of a LBA associated with the target distance as a two-dimensional coordinate, wherein an abscissa of the two-dimensional coordinate represents the target distance, an ordinate of the two-dimensional coordinate represents the corresponding process ID parameter, and the SSD obtains the M two-dimensional coordinates;
to establish the N state machines based on the M two-dimensional coordinates, the processor is further configured to:
perform a K-MEANS clustering operation on the M two-dimensional coordinates to obtain the N classes; and
establish N Long Short Term Memory networks (LSTM) state machines by taking the N classes as prediction targets of LSTM; and
to train the parameters of the N state machines by inputting the M two-dimensional coordinates to the N state machines, the processor is further configured to:
train parameters of the N LSTM state machines by inputting the M two-dimensional coordinates to the N LSTM state machines.

9. The SSD of claim 8, wherein the processor is further configured to:
determine a target LSTM state machine based on the trained parameters of the N LSTM state machines; and
classify the one or more subsequent LBAs based on the target LSTM state machine.

10. The SSD of claim 9, wherein the processor is further configured to:
receive one or more subsequent reading or writing commands sent from the host;
determine the one or more subsequent LBAs and one or more subsequent process ID parameters carried in the one or more subsequent reading or writing command sent from the host;
determine that a distance between adjacent subsequent LBAs is greater than the preset threshold;

input the distance between the adjacent subsequent LBAs and a process ID parameter of a corresponding current LBA as a two-dimensional coordinate into the target LSTM state machine; and obtain a heat classification of the one or more subsequent LBAs.

11. A system for predicting LBA information, comprising:
a host configured to generate reading or writing commands; and
a solid state drive (SSD), comprising a processor configured to:
receive a trace sent from a host, wherein the host acquires the trace of the SSD in a reusable environment;
determine, according to the trace, LBAs received by the SSD, wherein the trace comprises the reading or writing commands each of which carries a corresponding LBA and a corresponding process identifier (ID) parameter;
obtain a distribution of the LBAs by learning the LBAs based on a preset learning algorithm through:
determining M target distances from the LBAs, wherein M is a positive integer;
generating M two-dimensional coordinates based on the M target distances, wherein an abscissa and an ordinate of each two-dimensional coordinate represent a corresponding target distance and a process ID parameter of a LBA associated with the corresponding target distance, respectively;
establishing N state machines based on the M two-dimensional coordinates, wherein N is a positive integer; and
training parameters of the N state machines by inputting the M two-dimensional coordinates to the N state machines; and
predict one or more subsequent LBAs based on the distribution of the LBAs.

12. The system of claim 11, wherein the processor is further configured to:
determine, according to the trace, the reading or writing commands sent by the host; and
determine the corresponding LBA and the corresponding process ID parameter carried by each of the reading or writing commands.

13. The system of claim 11, wherein:
to determine the M target distances from the LBAs, the processor is further configured to:
determine a distance between each pair of adjacent LBAs from the LBAs, so that a plurality of distances are determined for a plurality of pairs of adjacent LBAs, respectively; and
determine the M target distances that are greater than a preset threshold value from the plurality of distances;
to generate the M two-dimensional coordinates based on the M target distances, the processor is further configured to:
for each target distance, record the target distances and a corresponding process ID parameter of a LBA associated with the target distance as a two-dimensional coordinate, wherein an abscissa of the two-dimensional coordinate represents the target distance, an ordinate of the two-dimensional coordinate represents the corresponding process ID parameter, and the SSD obtains the M two-dimensional coordinates;
to establish the N state machines based on the M two-dimensional coordinates, the processor is further configured to:
perform a K-MEANS clustering operation on the M two-dimensional coordinates to obtain the N classes; and
establish N Long Short Term Memory networks (LSTM) state machines by taking the N classes as prediction targets of LSTM; and
to train the parameters of the N state machines by inputting the M two-dimensional coordinates to the N state machines, the processor is further configured to:
train parameters of the N LSTM state machines by inputting the M two-dimensional coordinates to the N LSTM state machines.

14. The system of claim 13, wherein the processor is further configured to:
determine a target LSTM state machine based on the trained parameters of the N LSTM state machines; and
classify the one or more subsequent LBAs based on the target LSTM state machine.

15. The system of claim 14, wherein processor is further configured to:
receive one or more subsequent reading or writing commands sent from the host;
determine the one or more subsequent LBAs and one or more subsequent process ID parameters carried in the one or more subsequent reading or writing command sent from the host;
determine that a distance between adjacent subsequent LBAs is greater than the preset threshold;
input the distance between the adjacent subsequent LBAs and a process ID parameter of a corresponding current LBA as a two-dimensional coordinate into the target LSTM state machine; and
obtain a heat classification of the one or more subsequent LBAs.

* * * * *